(12) United States Patent
Bruno et al.

(10) Patent No.: US 8,587,469 B2
(45) Date of Patent: Nov. 19, 2013

(54) METAMATERIAL FOR A RADIO FREQUENCY COMMUNICATIONS APPARATUS

(75) Inventors: William M. Bruno, Manhattan Beach, CA (US); Dwight L. Ritums, Torrance, CA (US); David A. Brent, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 361 days.

(21) Appl. No.: 13/047,093

(22) Filed: Mar. 14, 2011

(65) Prior Publication Data

US 2012/0235848 A1 Sep. 20, 2012

(51) Int. Cl.
*G01S 7/36* (2006.01)

(52) U.S. Cl.
USPC .............. 342/16; 342/175; 343/789; 343/824

(58) Field of Classification Search
USPC ............................. 342/16, 175; 343/789, 824
See application file for complete search history.

(56) References Cited

U.S. PATENT DOCUMENTS

| | | | |
|---|---|---|---|
| 6,075,485 A | 6/2000 | Lilly et al. | |
| 7,307,589 B1 | 12/2007 | Gregoire et al. | |
| 7,379,030 B1 | 5/2008 | Lier | |
| 2004/0201526 A1* | 10/2004 | Knowles et al. | 343/700 MS |
| 2006/0176044 A1* | 8/2006 | Binder et al. | 324/71.1 |
| 2009/0256758 A1* | 10/2009 | Schlub et al. | 343/702 |

OTHER PUBLICATIONS

Eccleston, et al.: "*Compact Planar Microstripline Branch-Line and Rat-Race Couplers*"; IEEE Transactions on Microwave Theory and Techniques, vol. 51, No. 10, Oct. 2003; pp. 2119-2125.

Eleftheriades, et al.: "*Planar Negative Refractive Index Media Using Periodically L-C Loaded Transmission Lines*"; IEEE Transactions on Microwave Theory and Techniques, vol. 50, No. 12, Dec. 2002; pp. 2702-2712.

Iyer, et al.: "*A Multilayer Negative-Refractive-Index Transmission-Line (NRI-TL) Metamaterial Free-Space Lens at X-Band*"; IEEE Transactions on Antennas and Propagation, vol. 55, No. 10, Oct. 2007; pp. 2746-2753.

Iyer, et al.: "*A Three-Dimensional Isotropic Transmission-Line Metamaterial Topology for Free-Space Excitation*"; Applied Physics Letters 92, 261106 (2008); pp. 1-3.

Iyer, et al.: "*Effective-Medium Properties of a Free-Space Transmission-Line Metamaterial Superlens*"; 2009 13$^{th}$ International Symposium on Antenna Technology and Applied Electromagnetics and the Canadian Radio Sciences Meeting; pp. 1-4.

Iyer: "*Free-Space Metamaterial Superlenses Using Transmission-Line Techniques*"; A thesis submitted in conformity with the requirements for the degree of Doctor of Philosophy Graduate Department of Electrical Engineering, University of Toronto, © 2009; pp. 1-246.

\* cited by examiner

*Primary Examiner* — Timothy A Brainard
(74) *Attorney, Agent, or Firm* — Tarolli, Sundheim, Covell & Tummino LLP

(57) ABSTRACT

A metamaterial for a radio frequency communications apparatus is disclosed. The metamaterial can comprise a flex circuit and an array of circuit elements mounted on the flex circuit. Each of the circuit elements can comprise a conductive trace and at least one hybrid component electrically coupled to the conductive trace.

20 Claims, 14 Drawing Sheets

METAMATERIAL FOR A RADIO FREQUENCY COMMUNICATIONS APPARATUS

TECHNICAL FIELD

This invention relates to radio frequency (RF), microwave, and millimeter-wave communications. More particularly, this invention relates to a metamaterial for an RF communications apparatus.

BACKGROUND

Metamaterials are artificial materials engineered to have properties that may not be found in nature. Metamaterials can gain their properties from structure rather than composition, using small inhomogeneities to create effective macroscopic behavior.

A dielectric is an electrical insulator that can be polarized by an applied electric field. When a dielectric is placed in an electric field, electric charges do not flow through the material, as in a conductor, but only slightly shift from their average equilibrium positions causing dielectric polarization. Due to dielectric polarization, positive charges are displaced toward the field and negative charges shift in the opposite direction. If a dielectric is composed of weakly bonded molecules, those molecules not only become polarized, but also reorient so that their symmetry axis aligns to the field.

Magnetic permeability is the measure of the ability of a material to support the formation of a magnetic field within itself. Stated differently, the magnetic permeability of a material is the degree of magnetization that a material obtains in response to an applied magnetic field. The reciprocal of magnetic permeability is magnetic reluctivity.

SUMMARY OF THE INVENTION

One aspect of the invention relates to a metamaterial for a radio frequency communications apparatus. The metamaterial can comprise a flex circuit and an array of circuit elements mounted on the flex circuit. Each of the circuit elements can comprise a conductive trace and at least one hybrid component electrically coupled to the conductive trace.

Another aspect of the invention relates to a radio frequency communications apparatus including an artificial dielectric material. The artificial dielectric material can comprise a plurality of layers of flex circuit that are stacked relative to each other. Each layer of flex circuit of the plurality of layers of flex circuit can include an array of circuit elements mounted thereon. Each circuit element of the array of circuit elements can comprise conductive traces that are separated by a gap and extend linearly and a hybrid component mounted in the gap to electrically couple the conductive traces. The artificial dielectric material is configured to define a plurality of unit cells that define per unit volume performance characteristics of the artificial dielectric material.

Yet another aspect of the invention is related to a method for fabricating a layer of metamaterial for a radio frequency communications apparatus. The method can comprise providing a flex circuit. The method can also comprise arranging an array of circuit elements to electrically couple at least one hybrid component to a conductive trace in each circuit element to provide at least one of a predetermined relative dielectric constant and a predetermined relative magnetic permeability for the metamaterial.

DETAILED DESCRIPTION

Metamaterials can be employed in radio frequency (RF) communications systems, including antennas, waveguides, phased arrays, radar systems, etc. A metamaterial can be configured as an artificial dielectric material, an artificial magnetic material or a combination of both. In each configuration, hybrid components, which are packaged in a manner similar to integrated circuit chips and operate as discrete circuit components are electrically coupled between conductive traces in an array of circuit elements. That is, the hybrid components can make electrical connections between conductive traces in the array of circuit elements. The metamaterial can be formed from stacks of flex circuit, such that the metamaterial can be pliable, lightweight and relatively inexpensive. Such a metamaterial can be implemented in a wide array of applications, including, but not limited to antennas, radar systems, phased arrays, etc.

Figure 1:
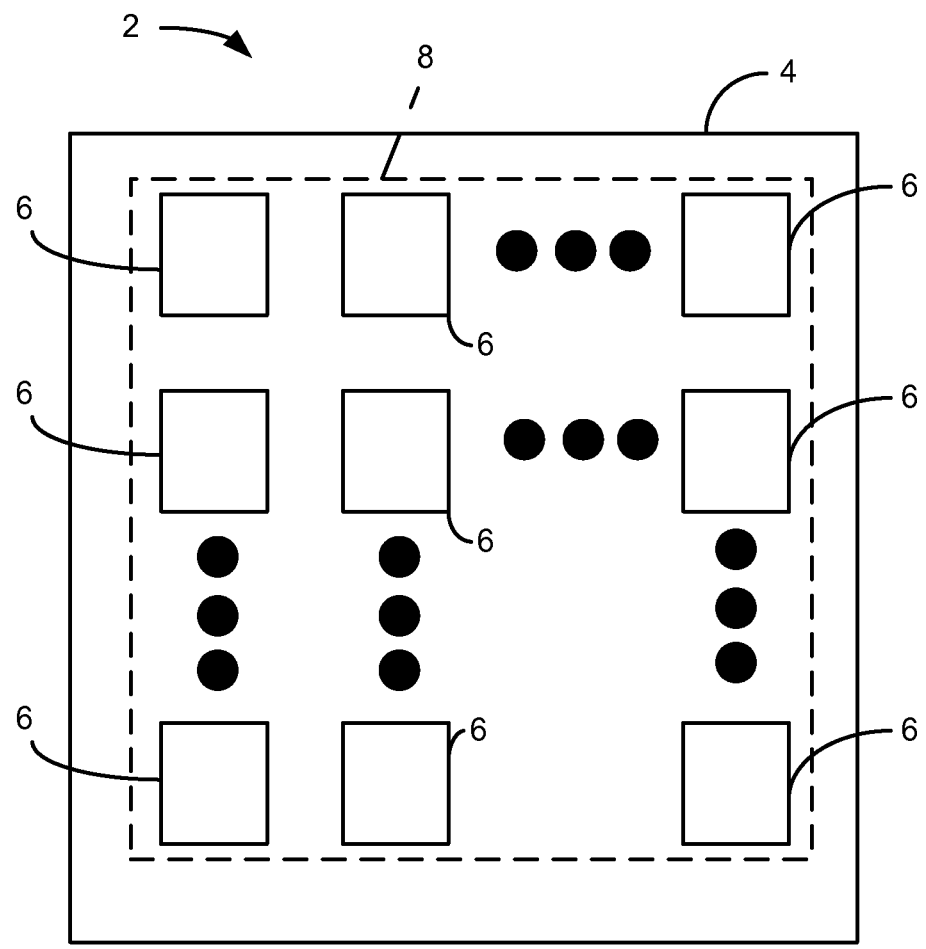
FIG. 1 illustrates a plan view of an example of a metamaterial.

FIG. 1 illustrates an example of a metamaterial 2 that can be employed to facilitate RF communications. The metamaterial can be implemented as an artificial dielectric material, an artificial magnetic material or as a combination of both. For instance, structural components for the metamaterial 2 can be selected to provide a relative dielectric constant to form an artificial dielectric material. Alternatively, structural components for the metamaterial 2 can be selected to provide a relative permeability to form an artificial magnetic material. As another alternative, structural components for the metamaterial 2 can be selected to provide a surface impedance to form a metamaterial that operates as both an artificial dielectric material and an artificial magnetic material, such as an artificial magnetic conductor. The metamaterial 2 includes a flexible printed circuit board ("flex circuit 4") provided as a substrate. The flex circuit 4 has a relatively low relative dielectric constant (e.g., less than 4) and is thin and lightweight. As one example, the flex circuit 4 can be formed from a material such as KAPTON®. Although flex circuit 4 can be employed as a substrate for the metamaterial 2, other materials, such as a rigid circuit board could be employed as well.

An M×N array of circuit elements 6 can be arranged on the flex circuit 4, wherein M and N are integers greater than or equal to one, which can be referred to as an element array 8. The element array 8 can be configured to provide one of a selected artificial dielectric and artificial magnetic material, or a combination of both. Each circuit element in the element array 8 can include at least two conductive traces that are separated by a gap (e.g., a non-conductive region of the flex circuit 4). One or more hybrid components can be mounted in the gap. Each circuit element 6 in the element array 8 can be configured the same or differently than other circuit elements 6 in the element array 8. Although the circuit elements 6 are illustrated as being separated from each other, it is to be understood that throughout the description, in some examples, the circuit elements 6 can share common borders. Stacks of the flex circuit 4 can be employed to achieve desired performance characteristics of the metamaterial 2. Moreover, the stacks of the flex circuit 4 can be separated by a foam layer, and electrically coupled together with vias.

Figure 2:
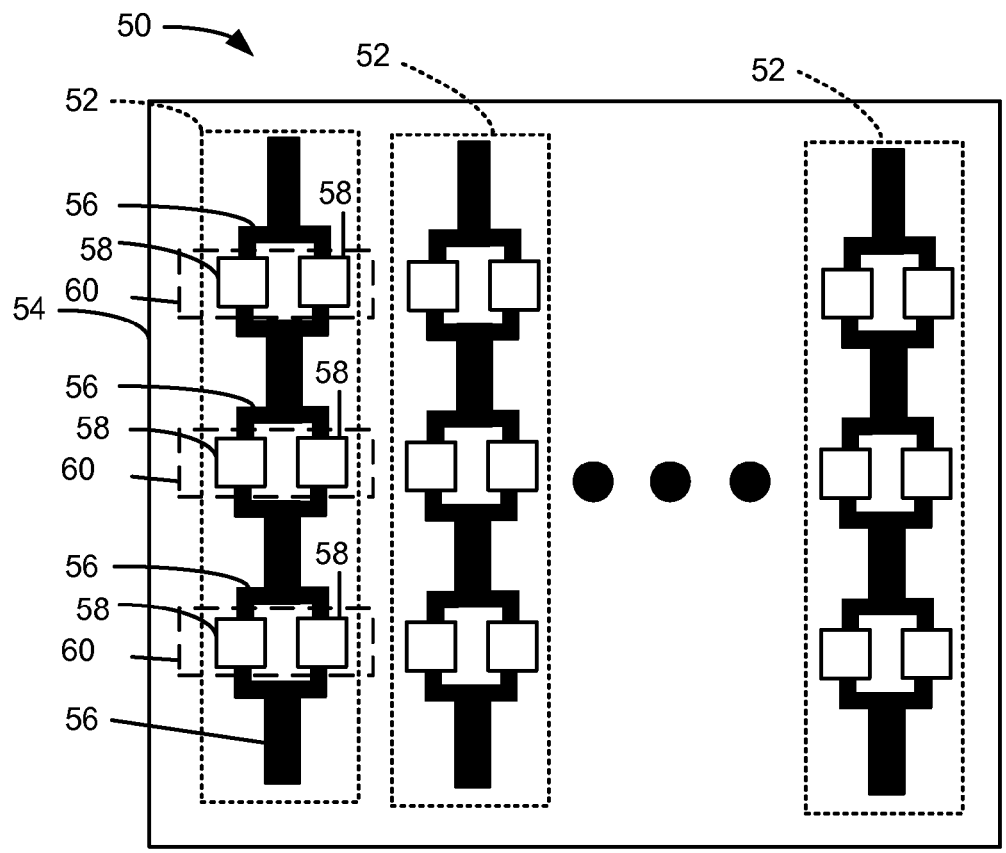
FIG. 2 illustrates a plan view of an example of an artificial dielectric material.

FIG. 2 illustrates a plan view of an example of an artificial dielectric material 50 (e.g., a metamaterial) that includes a 1×N element array of circuit elements 52 mounted on a flex circuit 54. In FIG. 2, each circuit element 52 extends linearly between opposing edges (or near opposing edges) of the flex circuit 54. For purposes of simplification of explanation, in FIG. 2 only one layer of the artificial dielectric material 50 is illustrated, but is to be understood that the artificial dielectric material 50 could be implemented with multiple layers, as explained herein. In FIG. 2, the circuit elements 52 of the element array are configured as conductive traces 56 in and/or on the flex circuit 54 with hybrid components schematically illustrated as 58 mounted in gaps 60 of the conductive traces 56. Although FIG. 2 (and other FIGS.) illustrates the gaps 60 as including part of the traces 56, it is to be understood that the gaps 60 are implemented as non-conductive regions between the traces 56. In some examples, the hybrid components 58 could be mounted on the conductive traces 56. For purposes of simplification of explanation, reference numbers have been added to only one of the circuit elements 52, but it is to be understood that other circuit elements could be implemented in a similar or different manner. In FIG. 2, each gap 60 between conductive traces of the circuit element 52 includes two hybrid components 58 connected in parallel, but depending on the environment of implementation, any number and/or configuration of hybrid components 58 can be employed. Each circuit element 52 can be coupled to different layers of the artificial dielectric by employing vias. Each circuit element 52 can have a length of less than about one-eighth to about a half wavelength of a wave of interest, namely an electromagnetic wave induced on the circuit element 52.

Figure 3:
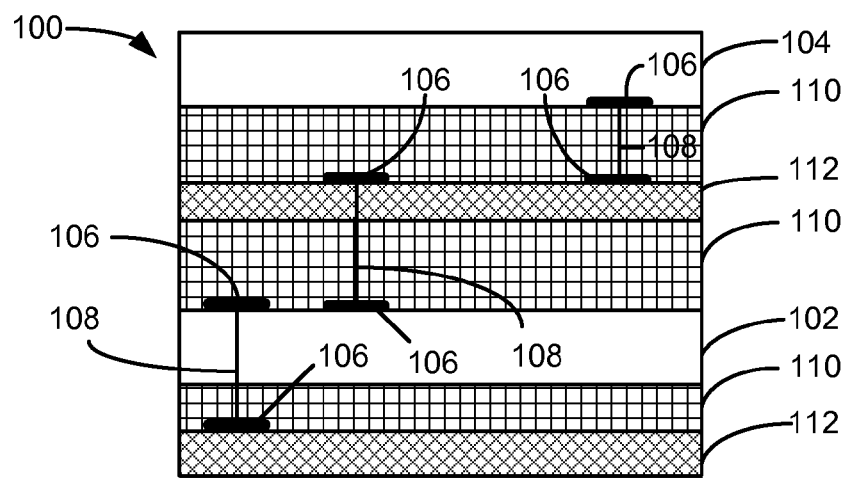
FIG. 3 illustrates a cross sectional view of an example of an artificial dielectric material.

FIG. 3 illustrates a cross sectional view of an artificial dielectric material 100 (e.g., the artificial dielectric material 50 illustrated in FIG. 2), with a stack (e.g., multiple) of layers. The layers of the artificial dielectric material 100 can include layers of flex circuit 102 and 104 that have hybrid components 106 electrically coupled together by the employment of vias 108. Furthermore, in some examples, such as illustrated in FIG. 3, one or more of the layers in the artificial dielectric material 100 can be implemented as a foam layer 110, and the artificial dielectric material 100 can include one or more layers of resistive material 112 with cooper traces on one or both sides, on which one or more of the hybrid components 106 can be mounted. Inclusion of the layers of resistive material 112 can prevent damage to the artificial dielectric material 100 due to electrostatic discharge (ESD). In some examples, such as the artificial dielectric material 100 illustrated in FIG. 3, one or more hybrid components 106 can be mounted on a layer of resistive material 112, and be surrounded by a foam layer 110. Moreover, in some examples, the layers of resistive material 112 can have lateral variations in conductivity. In such a situation, the layers of resistive material 112 can be employed to provide control signals to one or more of the hybrid components 106. In some examples, the vias 108 can be implemented as pogo-pins that provide some compressible qualities. In this manner, the artificial dielectric material 100 can be flexed (e.g., due to bending) without the loss of contact between the layers of the artificial dielectric material 100.

Figure 4:
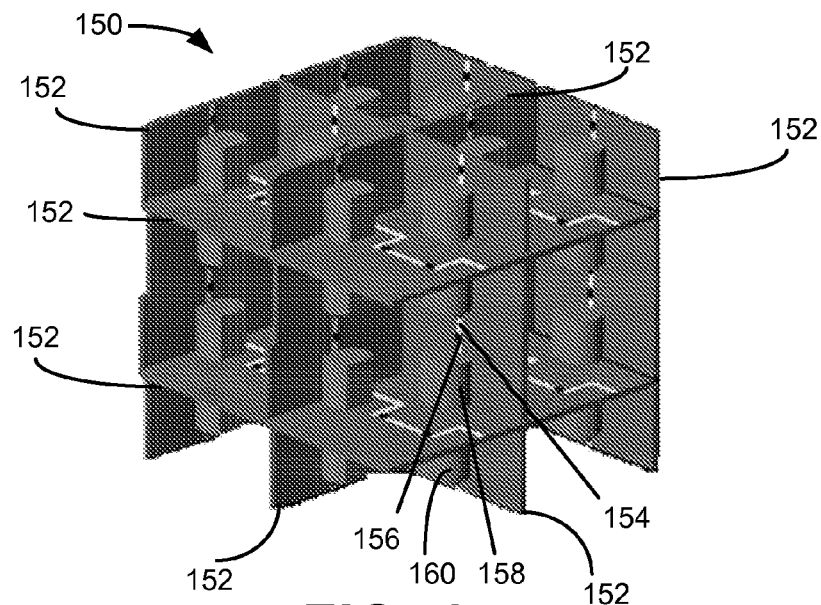
FIG. 4 illustrates a perspective view of another example of an artificial dielectric material.

FIG. 4 illustrates a perspective view of a three dimensional configuration for another example of an artificial dielectric material 150 (e.g., the artificial dielectric material 50 illustrated in FIG. 2) with layers of flex circuit 152. Each layer of flex circuit 152 can have conductive traces 154 with hybrid components 156 mounted thereon. The layers of flex circuit 152 can be arranged in a slotted egg carte configuration. The hybrid components 156 from different layers of flex circuit 152 can be electrically coupled together through the conductive traces 154 and with surface mount (SMT) male and female connectors 158 and 160. In such an example, the SMT male and female connectors 158 and 160 can provide a conductive coupling between the layers of flex circuit 152.

Referring back to FIG. 2, each hybrid component 58 can be implemented as one or more hybrid components 58. A hybrid component 58 is a relatively small number of circuit components (e.g., 100 or less) mounted on a substrate, such as a dielectric substrate (e.g., aluminum) and packaged in a manner similar to an integrated circuit chip. The hybrid components 58 can be configured as active components, such as varactor diodes and/or passive components, such as resistors, capacitors and inductors. Both the resistors and capacitors can be implemented relatively simply. However, due to the inherent difficulties of implementing an inductor in a packaged circuit, such as one of the hybrid components 58, an operational amplifier (Op Amp) configuration can be employed. Moreover, in certain applications, such as discussed herein, it may be desirable to provide a hybrid component 58 that operates as an inductor with a negative inductance. Some configurations of an Op Amp circuit can also be employed in this manner.

Figure 5:
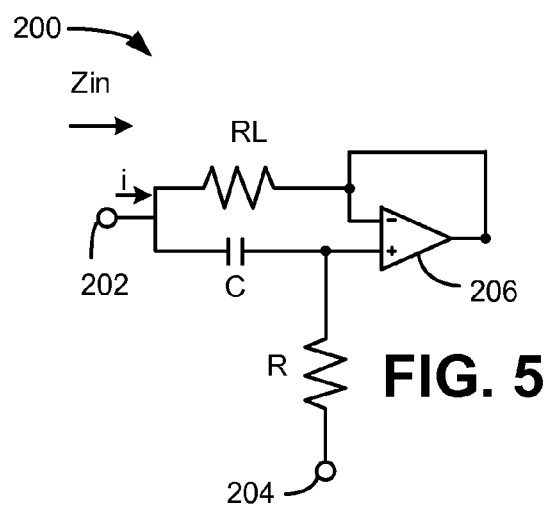
FIG. 5 illustrates a schematic diagram of an example of an operational amplifier circuit for a hybrid component.

FIG. 5 illustrates a schematic diagram of an example of an Op Amp circuit 200 that can be employed in a hybrid component (such as a hybrid component 58 illustrated in FIG. 2) as an inductor with a positive inductance. In the Op Amp circuit 200, an impedance ($Z_{in}$) (labeled in FIG. 5 as Zin) with a substantial inductance can be measured between terminals 202 and 204. As one example, a resistor, $R_L$ (labeled in FIG. 5 as 'RL') can be coupled to terminal 202, an inverting input terminal and an output terminal of an Op Amp 206. Moreover, a capacitor, C (labeled in FIG. 5 as 'C') can be coupled to the terminal 202 and a non-inverting terminal of the Op-Amp. A resistor, R (labeled in FIG. 5 as 'R') can also be coupled to the non-inverting terminal of the Op Amp 206 and to the terminal 204. A positive alternating current (AC) signal, i (labeled in FIG. 5 as 'i') at a frequency (in radians) of ω can be applied to the terminal 202. In such a configuration the impedance $Z_{in}$ for the Op Amp circuit 200 can be calculated by Equation 1:

$$Z_{in} = R_L + j\omega R_L RC \qquad \text{Equation 1;}$$

wherein:

j is equal to $\sqrt{-1}$.

Figure 6:
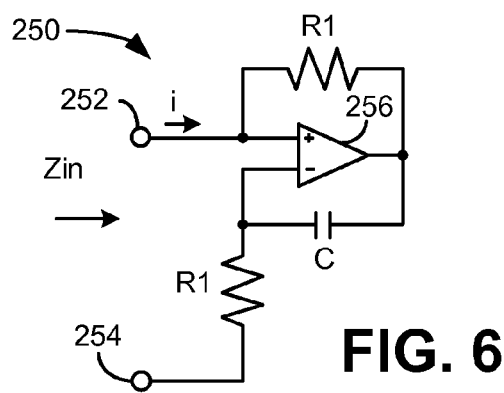
FIG. 6 illustrates a schematic diagram of another example of an operational amplifier circuit model for a hybrid component.

FIG. 6 illustrates a schematic diagram of an example of an Op Amp circuit 250 that can be employed in a hybrid component (such as the hybrid component 58 illustrated in FIG. 2) as an inductor with a negative inductance. In the Op Amp circuit 250, an impedance ($Z_{in}$) (labeled in FIG. 6 as Zin) with a substantial negative inductance can be measured between terminals 252 and 254. As one example, a resistor, $R_1$ (labeled in FIG. 6 as 'R1') can be coupled to terminal 252, a non-inverting input terminal and an output terminal of an Op Amp 256. Moreover, a capacitor, C (labeled in FIG. 6 as 'C') can be coupled to the output terminal of the Op Amp 256 and an inverting terminal of the Op Amp 256. Another resistor with the same resistance is $R_1$ (also labeled in FIG. 6 as R1) can also be coupled to the inverting terminal of the Op Amp 256 and to terminal 254. A positive alternating current (AC) signal, i (labeled in FIG. 6 as 'i') at a frequency (in radians) of $\omega$ can be applied to the terminal 252. In such a configuration the impedance $Z_{in}$ for the Op Amp circuit 250 can be calculated by Equation 2:

$$Z_{in} = -j\omega C R_1^2 \qquad \text{Equation 2;}$$

wherein j is equal to $\sqrt{-1}$.

Referring back to FIG. 2, by employing hybrid components 58, such as the Op Amp circuits 200 and 250 illustrated in FIGS. 5 and 6, nearly any impedance per unit volume of artificial dielectric material, which can be referred to as a unit cell, can be designed. The unit cell can represent a three dimensional circuit model for a given section of the artificial dielectric material 50, and can define per unit volume performance characteristics for the artificial dielectric material 50. As one example, illustrated in FIG. 7, a unit cell 300 can be implemented as three RLC parallel tank circuits connected in series between two terminals 302 and 304. An RLC parallel tank circuit includes a resistor, and inductor and a capacitor connected in parallel. Each RLC parallel tank circuit can be implemented as a capacitor (labeled in FIG. 7 as C1, C2 and C3), an inductor (labeled in FIG. 7 as L1, L2 and L3) and a resistor (R1, R2 and R3) connected in parallel. Each capacitor, inductor and resistor of each RLC parallel tank circuit can be implemented, for example, as a hybrid component. The hybrid components of each RLC parallel tank circuit could be mounted on the same or different layers of the artificial dielectric material. A complex impedance, $Z_1$ for a first RLC parallel tank circuit of the three RLC parallel tank circuits can be calculated by Equation 3.

$$Z_1 = \frac{1}{\frac{1}{Z_{R_1}} + \frac{1}{Z_{L_1}} + \frac{z}{Z_{C_1}}} \qquad \text{Equation 3}$$

wherein:
$Z_{R1}$ is the resistance (in ohms) of R1;
$Z_{L1}$ is $2\pi j f L_1$ (wherein $L_1$ is in henrys);
$Z_{C1}$ is $$\frac{-j}{2\pi f C_1}$$

(wherein $C_1$ is in farads); and
f is frequency in Hz and j is equal to $\sqrt{-1}$.

Using a similar equation to Equation 3, a complex impedance, $Z_2$ and $Z_3$, for the second and third RLC parallel tank circuits can also be calculated. Moreover, a mesh impedance (usually an inductance) $Z_0$ can be calculated by modeling software, employment of Wait's formula, etc. A total combined complex impedance, $Z_{Tot}$ can be calculated by Equation 4.

$$Z_{Tot} = Z_0 + Z_1 + Z_2 + Z_3 \qquad \text{Equation 4.}$$

Moreover, a relative dielectric constant for the unit cell 300 can be calculated. The relative dielectric constant for the unit cell 300 can be based, for example, on the physical dimensions of the unit cell 300. In the unit cell 300 illustrated in FIG. 7, a horizontal length, $L_X$ (labeled in FIG. 7 as 'LX'), a vertical length, $L_Y$ (labeled in FIG. 7 as 'LY') and a depth length, $L_Z$ (labeled in FIG. 7 as 'LZ') can define three-dimensional boundaries of the unit cell 300. A unit cell size factor, $\alpha$, can be calculated by Equation 5.

$$\alpha = \frac{L_Y}{L_X L_Z} 6.73 \times 10^{11} \text{in Hz;} \qquad \text{Equation 5}$$

wherein $L_X$, $L_Y$ and $L_Z$ are the unit cell 300 dimensions, in inches.

Upon calculating the unit cell size factor, $\alpha$, a complex relative dielectric constant, $\in_r$, for the unit cell 300 can be calculated with Equations 6, 7 and 8.

$$\text{Re}(\epsilon_r) = \frac{\alpha}{f} \text{Im}\left(\frac{1 \text{ ohm}}{Z_{Tot}}\right) \qquad \text{Equation 6}$$

$$\text{Im}(\epsilon_r) = \frac{-\alpha}{f} \text{Re}\left(\frac{1 \text{ ohm}}{Z_{Tot}}\right) \qquad \text{Equation 7}$$

$$\epsilon_r = \text{Re}(\epsilon_r) + \text{Im}(\epsilon_r) j. \qquad \text{Equation 8}$$

Upon calculation of the complex relative dielectric constant, $\in_r$, for the unit cell 300, in certain environments of application, it may be desirable to calculate an index of refraction, n, for the unit cell 300. In such a situation, if a substrate of the unit cell 300 (e.g., flex circuit) is relatively thin, whereby the substrate makes a negligible (or nearly negligible) contribution to the relative dielectric constant of the unit cell 300, the index of refraction, n, can be calculated by Equation 9.

$$n = \sqrt{\epsilon_r \mu_r} \qquad \text{Equation 9;}$$

wherein $\mu_r$ is the relative permeability of the unit cell 300, and can be assumed to be equal to 1.

In the present example, the unit cell 300 can provide a refractive index profile for single (one dimensional) polarization (e.g., uniaxial anisotropy), such as an electric field in the vertical (or Y) direction of the unit cell 300 and propagation in the depth (Z) direction of the unit cell 300.

Performance characteristics of the unit cell 300 can be measured and/or simulated. In one example, the unit cell 300 can be configured with the following parameters defined in Table 1:

TABLE 1

| Resistors (ohms) | | | Inductors (nH) | | | Capacitors (pF) | | |
|---|---|---|---|---|---|---|---|---|
| R1 | R2 | R3 | L1 | L2 | L3 | C1 | C2 | C3 |
| 2 | 9 | 230 | 200 | 18 | 20 | 100 | 1 | 1 |

Figure 8:
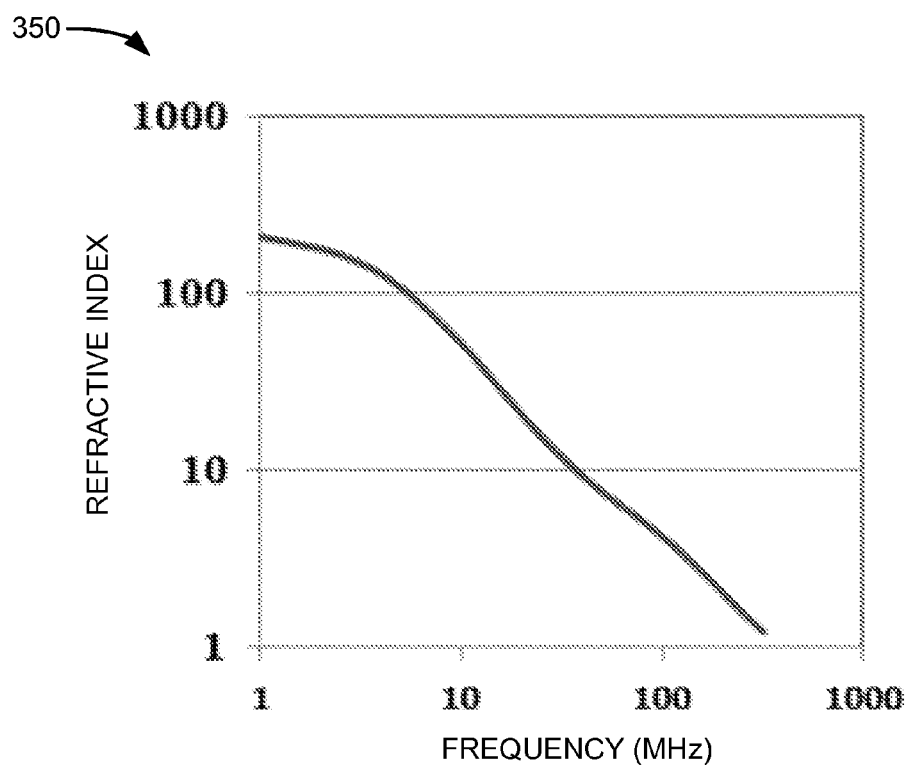
FIG. 8 illustrates an example of a graph that plots refractive index as a function of frequency for a metamaterial.
Figure 9:
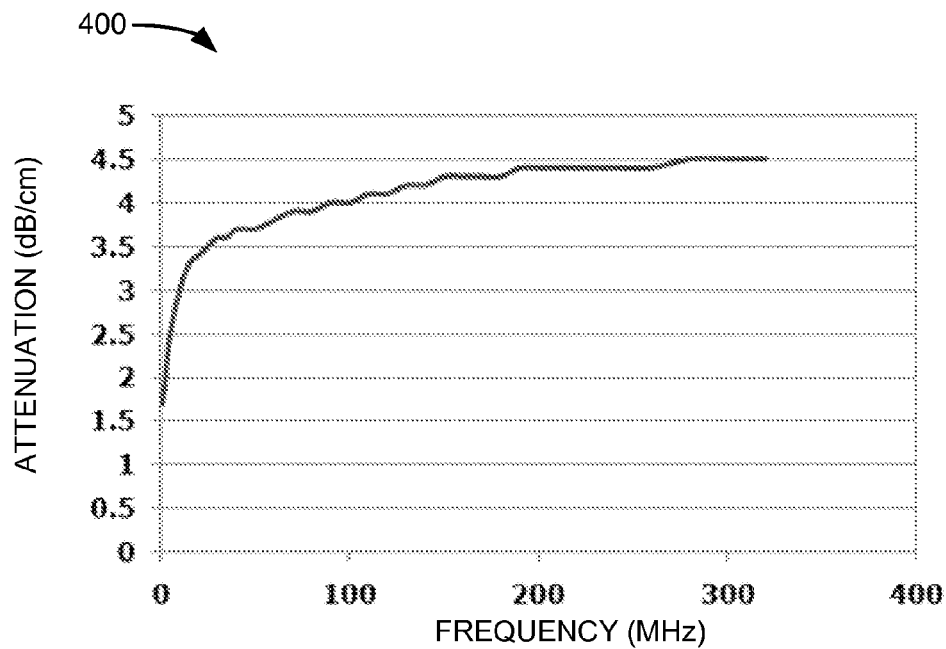
FIG. 9 illustrates an example of a graph that plots attenuation as a function of frequency for a metamaterial.

Moreover, in the present example, $L_X$, $L_Y$ and $L_Z$ can each be 0.6 inches (e.g., a cube). In such an example, FIG. 8 illustrates a graph 350 depicting a refractive index for a metamaterial that employs the unit cell 300 plotted as a function of frequency in megahertz (MHz). FIG. 9 illustrates a graph of attenuation 400, in decibels per centimeter (dB/cm), of a metamaterial that employs the unit cell 300 in the present example plotted as a function of frequency, in megahertz (MHz).

Figure 10:
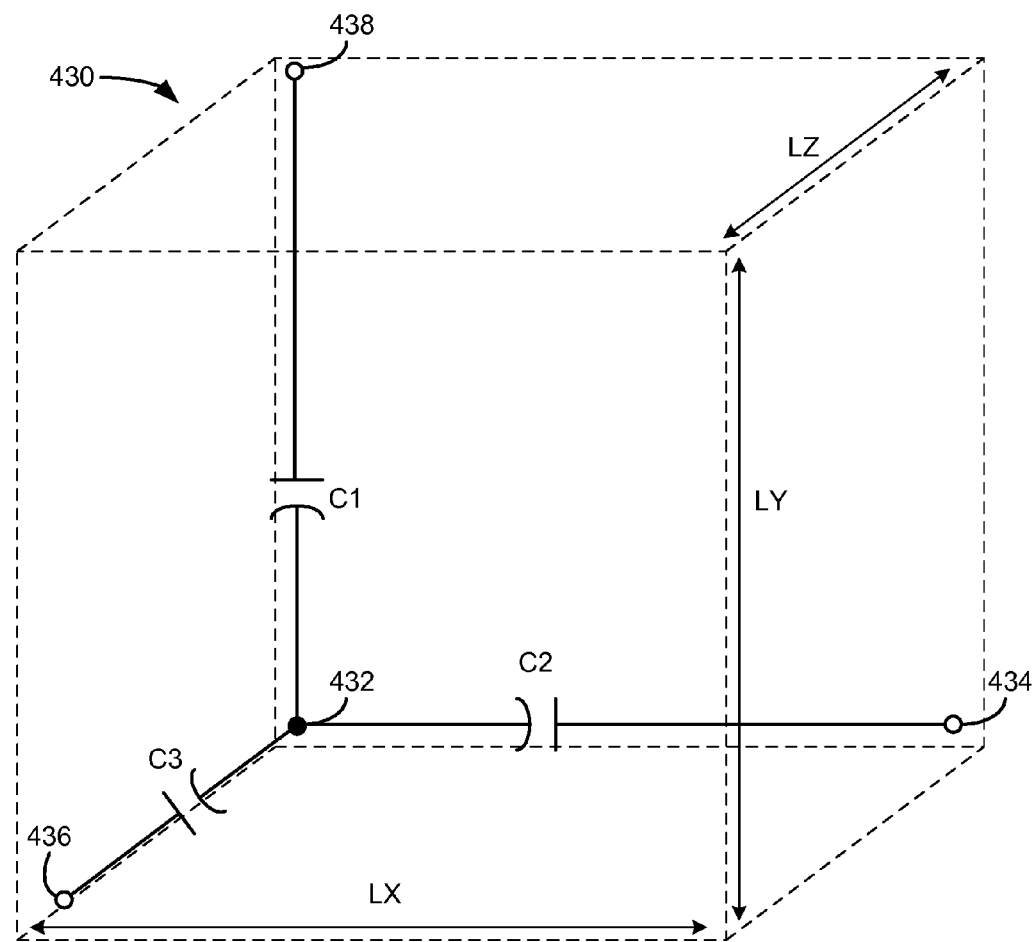
FIG. 10 illustrates another example of a unit cell of an artificial dielectric material.

Referring back to FIG. 2, by employment of the artificial dielectric material 50, a relatively wide range of relative dielectric constants can be achieved. For instance, by employing an array of unit cells, such as the unit cell 300 illustrated in FIG. 7, a relative dielectric constant $\in_r$, between values of about 2 and about 2000 can be realized. Moreover by employing such an array of unit cells, an index of refraction between about 1.414 and about 45 can be realized. Furthermore, by employing an array of the unit cells with multiple configurations, a refractive index for two and three orthogonal directions can also be implemented. FIG. 10 illustrates an example of a unit cell 430 that can be employed to control a dielectric constant in three orthogonal directions.

In the unit cell 430, three different capacitors (labeled in FIG. 10 as C1, C2 and C3), which could be implemented as hybrid components and conductive traces that extend perpendicularly from a common node 432 to one of three terminals 434, 436 and 438. Moreover, although the unit cell 430 is illustrated as being implemented with only capacitors, other components (e.g., inductors and/or resistors) could be employed as well. In some examples, each capacitor in the unit cell 430 could have the same capacitance, however in other examples each capacitor in the unit cell 430 could have a different capacitance. The unit cell 430 can have physical dimensions defined by $L_X$ (labeled in FIG. 10 as 'LX'), $L_Y$ (labeled in FIG. 10 as 'LY') and $L_Z$ (labeled in FIG. 10 as 'LZ'). The unit cell 430 could be implemented, for example, with only capacitors to provide an artificial dielectric that is nearly dispersionless, broadband, and nearly lossless. For instance, an artificial dielectric employing the unit cell 430 could be configured to provide an index of refraction between 1.3 and at least 46.

Figure 11:
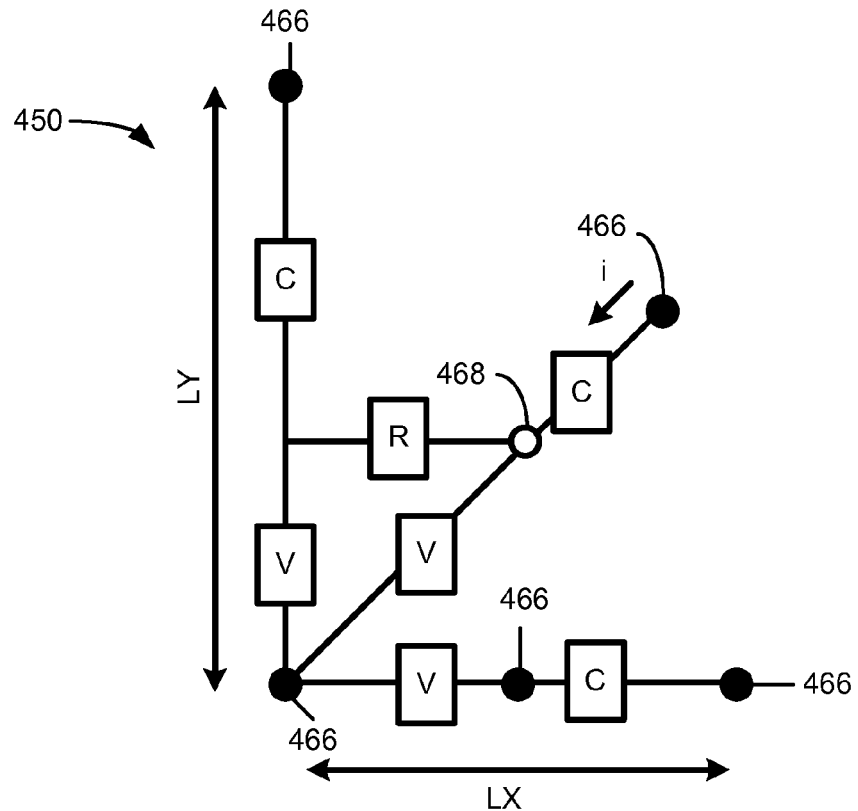
FIG. 11 illustrates an example of a plan view of an example of a unit cell for a tunable artificial dielectric material.
Figure 12:
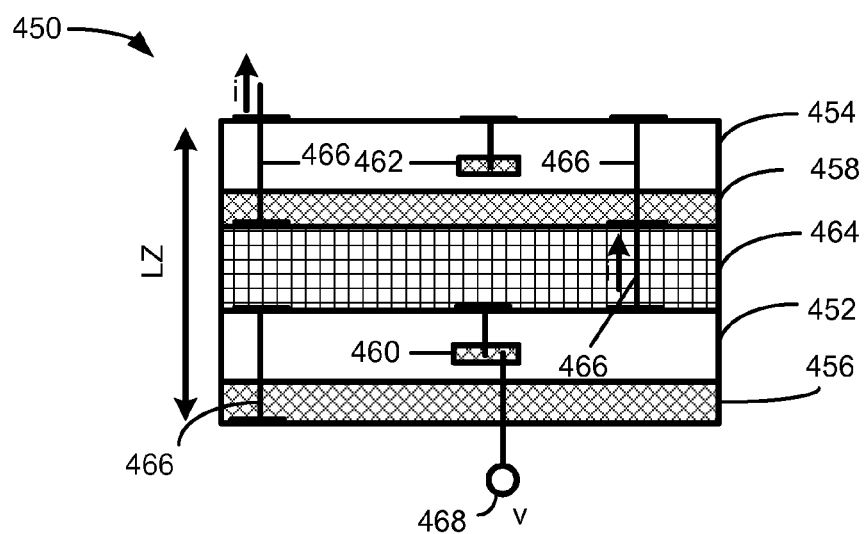
FIG. 12 illustrates an example of a cross sectional view of the unit cell illustrated in FIG. 11.

Referring back to FIG. 2, as noted, in some examples, circuit components, such as a varactor diode can be employed as the aforementioned hybrid components 58. In this manner, an artificial dielectric material 50 with a tunable (adjustable) relative dielectric constant and index of refraction can be realized. FIGS. 11 and 12 illustrate an example of a unit cell 450 with a variable capacitance that can be employed to implement, for example, a tunable artificial dielectric material (such as the dielectric material 50 illustrated in FIG. 2). FIG. 11 illustrates a plan view of the unit cell 450 while FIG. 12 illustrates a cross sectional view of the unit cell 450. The unit cell 450 could be implemented, for example, in a phased array. The unit cell 450 can include first and second layers of flex circuit 452 and 454. As one example, the unit cell 450 can include first and second resistance layers 456 and 458 that can provide a predetermined resistance per square unit area (e.g., per square inch) such as about 100,000 Ohms per square unit area (Ω/square). The first and second layers of flex circuit 452 and 454, formed, for example, from KAPTON®, can be disposed on the first and second resistance layers 456 and 458, respectively. Resistance regions 460 and 462 with about a resistance of 5000 Ohms per square unit area can be disposed on and/or within each of the first and second layers of flex circuit 452 and 454. Furthermore, a non-conductive foam layer 464 can be disposed upon the first layer of flex circuit 452. Pogo-pins or male and/or female connectors 466 can be employed as vias to electrically couple different layers.

The unit cell 450 can have hybrid components mounted throughout the unit cell 450 in the manner illustrated in FIGS. 11 and 12. In the present example, the hybrid components can be implemented as resistors (labeled schematically in FIG. 11 as 'R'), capacitors (labeled schematically in FIG. 11 as 'C') or varactor diodes, labeled schematically in FIG. 11 as 'V'). The unit cell 450 can include, for example, an input terminal 468 coupled to a capacitor. For purposes of simplification of explanation, each hybrid component of a given type (resistor, capacitor and varactor diode) can be assumed to have equal performance, but other implementations are possible. The unit cell 450 can have physical dimensions defined by $L_X$ (labeled in FIG. 11 as 'LX'), $L_Y$ (labeled in FIG. 11 as 'LY') and $L_Z$ (labeled in FIG. 12 as 'LZ').

The unit cell 450 can provide a variable impedance with significant capacitance effects upon the application of a control signal to the input terminal 468, such that the impedance of the unit cell 450 varies as a function of an amplitude of the control signal, which could be implemented as a control voltage, labeled in FIG. 12 as 'v.'. It is to be understood that in other examples, the control voltage, v, could be implemented as a control current. In this manner, specific impedances for a current induced, i, by an electromagnetic wave can be achieved from design, tuning, or a combination of both.

Figure 7:
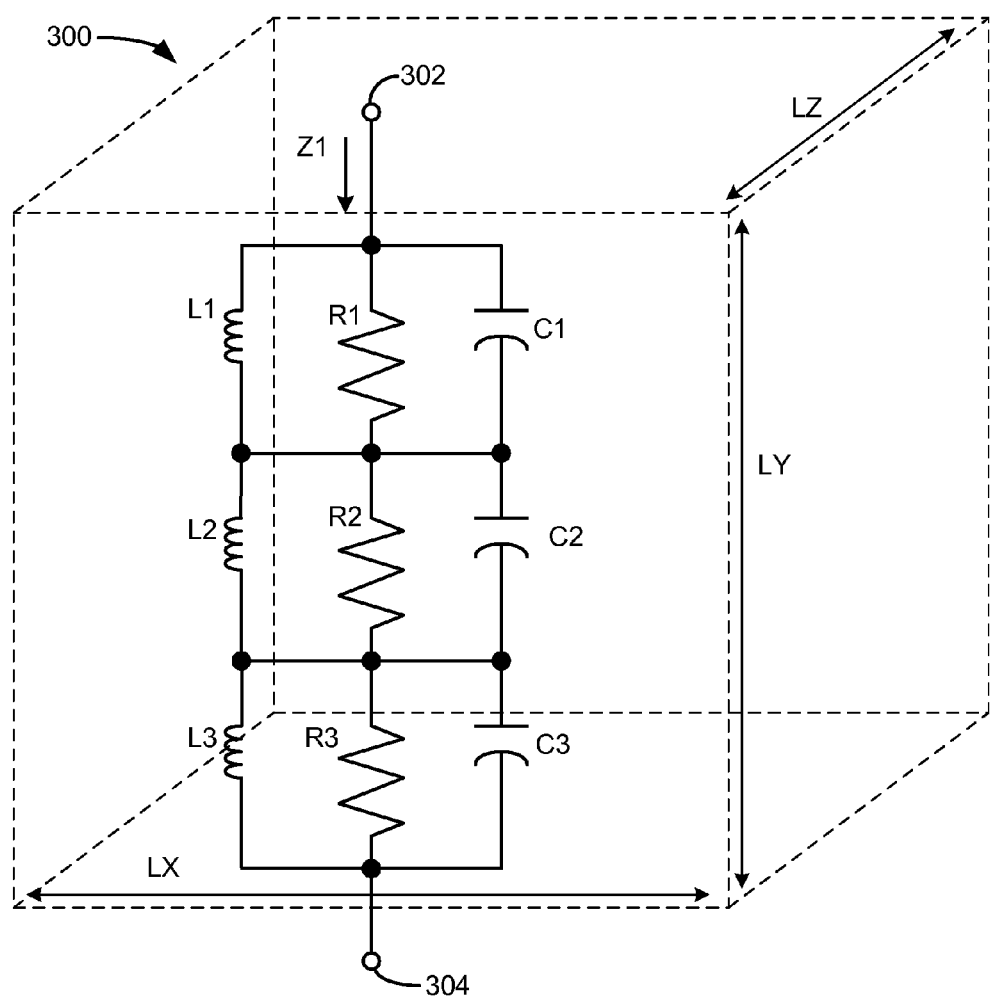
FIG. 7 illustrates an example of a unit cell of an artificial dielectric material.

Referring back to FIG. 2, employment of an array of unit cells that includes the unit cell 450 illustrated in FIGS. 11 and 12, the unit cell 430 illustrated in FIG. 10 and/or the unit cell 300 illustrated in FIG. 7 can provide an artificial dielectric material 50 that provides almost no (e.g., about 0) magnitude of transmission reflections for a wide range of frequencies (e.g., about 130 MHz to about 20 GHz), thus, if the artificial dielectric material 50 is implemented in an antenna system, a relatively high antenna gain can be realized. Additionally, such an artificial dielectric material 50 can provide a nearly constant phase shift of about 90 degrees for an induced electromagnetic wave over a frequency range of about two decades (e.g., about 3 MHz to about 300 MHz) by having a refractive index that varies inversely with the frequency of the induced electromagnetic wave. By utilizing the artificial dielectric material 50, it is possible to provide a lightweight (e.g., 0.4 ounces per square feet), thin (e.g., about 0.1 inches), low-cost, tight tolerance and flexible material with superb performance characteristics. Such an artificial dielectric material 50 can be employed, for example, as a foldable antenna (e.g., mounted on an aircraft), an antenna for personal and/or small unit use, such as an antenna mounted on a small vehicle and/or a mobile telephone, etc.

Figure 13:
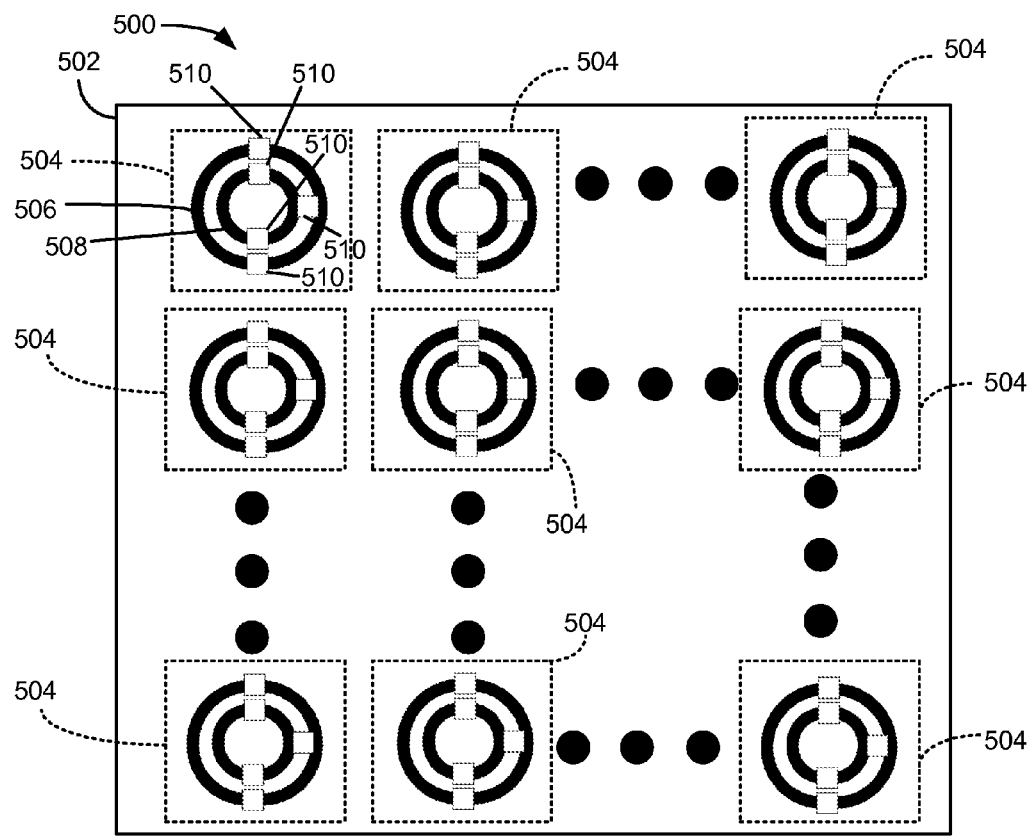
FIG. 13 illustrates a plan view of an example of an artificial magnetic material.

FIG. 13 illustrates a plan view of an example of a layer of artificial magnetic material 500 (e.g., a metamaterial) that includes an M×N element array mounted on a flex circuit 502. The artificial magnetic material 500 can be employed, for example, in an RF communications system. For purposes of simplification of explanation, only one layer of the artificial magnetic material 500 is illustrated, but it is to be understood that additional layers could be employed in a manner described herein. In FIG. 13, the circuit elements 504 are configured a set of concentric loops of conductive traces 506 and 508, namely an outer loop 506 and an inner loop 508, in the flex circuit 502 with hybrid components schematically illustrated as 510 that are mounted in gaps of the outer loop 506 and inner loop 508. For purposes of simplification of explanation, only the details of one of the circuit elements 504 include reference numbers, but it is to be understood that each of the circuit elements 504 could be implemented in a similar or different manner. Although the loops disclosed in FIG. 13 are illustrated as being circular, other configurations (e.g., squares, rectangles, etc.) could also be employed. The hybrid components 510 could be implemented, for example, as varactor diodes, transistors (field effect and/or bipolar junction) capacitors, inductors and resistors, such as those as described with respect to FIG. 2. Moreover, the hybrid components 510 and/or the outer and inner loops 506 and 508 can be electrically coupled to other layers of artificial magnetic material, such as in a manner illustrated with respect to FIGS. 3 and 4. Furthermore, as illustrated, one or more of the hybrid components 510 can electrically couple the outer and inner loops 506 and 508. Each of the outer and inner loops 506 and 508 can have a total perimeter (e.g., a circumference) of less than or equal to a half of a wavelength of a wave at a frequency of interest, namely a wave induced on the artificial magnetic material. Employment of hybrid components 510 that operate as inductors and/or capacitors enables a resonant frequency for a given circuit element 504 to be virtually independent of the circumference of the outer and inner loops 506 and 508.

By employing hybrid components 510, such as those described herein, a unit cell with nearly any 1-port impedance of artificial magnetic material can designed. Moreover, if unit cells of the artificial magnetic material 500 are implemented with only passive hybrid components 510, nearly any impedance that satisfies Kramers-Kronig relations can be achieved. Equations 10-12 describe Kramers-Kronig relations for impedance.

$$Z_{IM}(f) = \frac{Z}{\pi} f \int_0^{\infty} \frac{Z_{RE}(f') - Z_{RE}(f)}{f'^2 - f^2} df \mu_r(\omega);$$ Equation 10

$$= 1 - \frac{\pi \left(\frac{a}{L_X L_Y L_Z}\right)^2 \omega^2}{\omega^2 - \omega_0^2 + j\omega\zeta}$$

$$Z_{RE}(f) = -\frac{2}{\pi} \int_0^{\infty} \frac{f' Z_{IM}(f') - f Z_{IM}(f)}{f'^2 - f^2} df \mu_r(\omega);$$ Equation 11

$$= 1 - \frac{\pi \left(\frac{a}{L_X L_Y L_Z}\right)^2 \omega^2}{\omega^2 - \omega_0^2 + j\omega\zeta}$$

$$Z(f) = Z_{RE}(f) + Z_{IM}(f) \mu_r(\omega)$$ Equation 12

$$= 1 - \frac{\pi \left(\frac{a}{L_X L_Y L_Z}\right)^2 \omega^2}{\omega^2 - \omega_0^2 + j\omega\zeta};$$

wherein:
f is the frequency, in hertz of a signal induced on the artificial magnetic material 500.
j is equal to $\sqrt{-1}$.

Figure 14:
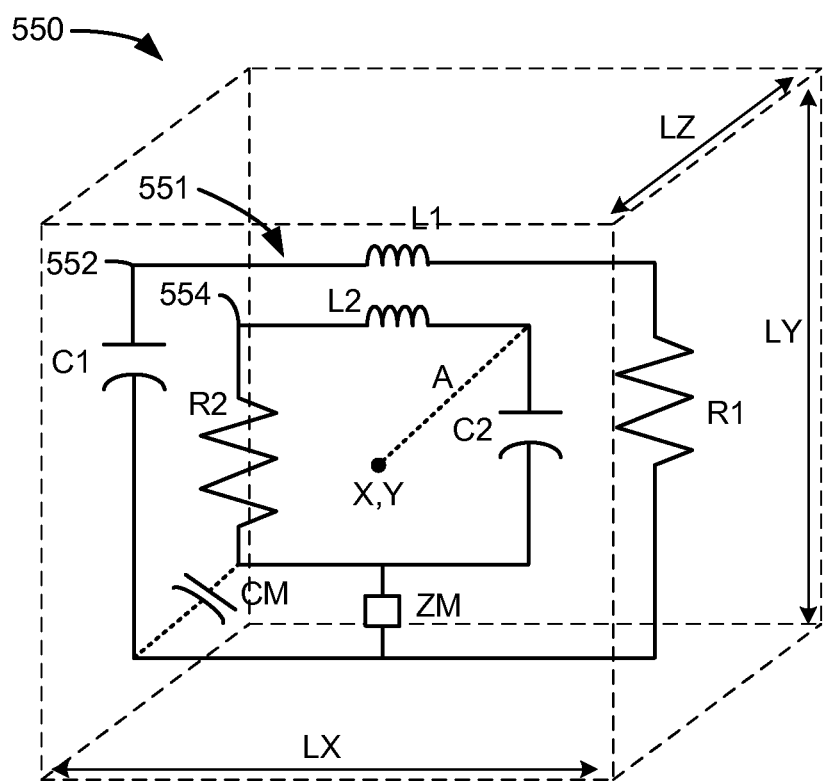
FIG. 14 illustrates an example of a circuit model for a unit cell for an artificial magnetic material.

FIG. 14 illustrates an example of a unit cell 550 with an equivalent circuit model 551, which could be employed as a unit cell of the artificial magnetic material 500 illustrated in FIG. 13. The hybrid components (e.g., the hybrid components 510 illustrated in FIG. 13) of the equivalent circuit model 551 can be mounted on a single layer of artificial magnetic material (e.g. flex circuit) such that the equivalent circuit model 551 can be considered planar. The equivalent circuit model 551 includes an outer loop 552 and an inner loop 554, wherein the outer and inner loops 552 and 554 are concentric and respectively correspond to the outer and inner loops 506 and 508 of the circuit element 504 illustrated in FIG. 13. The inner loop 554 has a center point, schematically denoted as "X,Y", and the inner loop has a radius, 'a' schematically denoted as 'A'. The unit cell 550 has physical dimensions $L_x$ (labeled in FIG. 14 as 'LX'), $L_Y$ (labeled in FIG. 14 as 'LY') and $L_Z$ (labeled in FIG. 14 as 'LZ').

The outer loop 552 can include, for example, a capacitor $C_1$ (labeled in FIG. 14 as 'C1'), an inductor $L_1$ (labeled in FIG. 14 as 'L1') and a resistor $R_1$ (labeled in FIG. 14 as 'R1') connected in series. The inner loop 554 can include, for example, a resistor R2 (labeled in FIG. 14 as 'R2'), an inductor L2 (labeled in FIG. 14 as 'L2'), and a capacitor $C_2$ (labeled in FIG. 14 as 'C2') connected in series. A coupling impedance, $Z_m$ (labeled in FIG. 14 as 'ZM') can represent, for example, one or more hybrid components (e.g., the hybrid components 510 illustrated in FIG. 13) that are employed to electrically couple the outer and inner loops 552 and 554. Moreover, a coupling capacitance between the outer and inner loops can be represented as $C_m$ (labeled in FIG. 14 as 'CM').

For purposes of simplification of explanation, in the present example, it will be presumed that $C_m$ is about 0, $R_1$ is equal to $R_2$, $C_1$ is equal to $C_2$ and $L_1$ is equal to $L_2$, such that the hybrid components of the unit cell 550 can simply be referred to as R, L and C, which are equivalent to $R_1$ or $R_2$, $L_1$ or $L_2$, and $C_1$ or $C_2$, respectively. Thus, the equivalent circuit model 551 can be simplified as a simple circuit with a resistor R, an inductor L and a capacitor C connected in a single series loop. In such an example, if the unit cell 550 is subject to an excitation magnetic field H with a frequency of ω (in radians), a relative magnetic permeability ($\mu_r$) for the artificial magnetic material can be calculated with Equation 13.

$$\mu_r(\omega) = 1 - \frac{\pi \left(\frac{a}{L_X}\right)^2 \omega^2}{\omega^2 - \omega_0^2 + j\omega\zeta};$$ Equation 13 wherein:
j is equal to $\sqrt{-1}$
ζ is the damping factor (due to R) of the equivalent circuit model 551; and
$\omega_0$ is the resonant frequency (in radians) of the equivalent circuit model 551, which can be calculated by Equation 14.

$$\omega_0 = \frac{1}{\sqrt{LC}};$$ Equation 14 wherein:
L is equal to the inductance (in Henrys) of L; and
C is equal to the capacitance (in Farads) of C.

Referring back to FIG. 13, by employment of unit cell, such as the unit cell 550 illustrated in FIG. 14, a relative magnetic permeability for the artificial magnetic material of about −10 to about 10 can be achieved.

Figure 15:
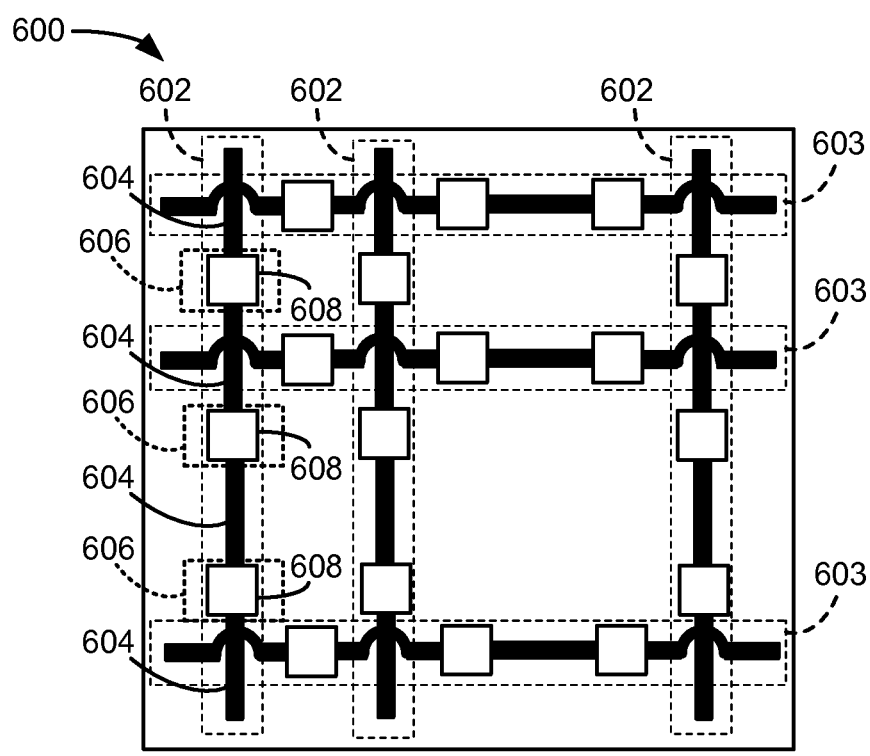
FIG. 15 illustrates a plan view of another example of a metamaterial.

FIG. 15 illustrates a plan view of another example of a metamaterial 600. The metamaterial 600 can be employed, for example as a combination of an artificial dielectric material and an artificial magnetic material. The metamaterial 600 can include M columns of circuit elements 602 that are overlapped by N rows of circuit elements 603. It is to be understood that the columns of circuit elements 602 and the rows of circuit elements 603 can be implemented on different layers of the metamaterial 600, such that the columns of circuit elements 602 and the rows of circuit elements 603 are electrically isolated from each other, such as illustrated in FIG. 15. Each column circuit element 602 can include a plurality of conductive traces 604 separated by gaps 606. For purposes of simplification of explanation, only one column circuit element 602 is labeled, but it is to be understood that other column circuit elements 602 could be implemented in a similar or different fashion. Hybrid components, schematically illustrated as 608 are electrically coupled between the conductive traces 604. That is, the hybrid components 608 can make electrical connections between conductive traces 604. The rows of circuit elements 603 can be implemented in a similar fashion.

Figure 16:
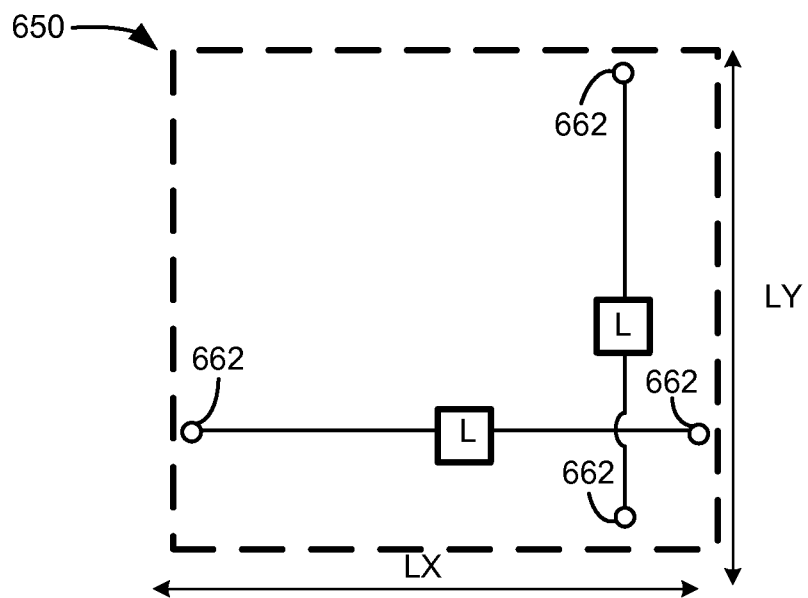
FIG. 16 illustrates a plan view of an example of a unit cell for a metamaterial.
Figure 17:
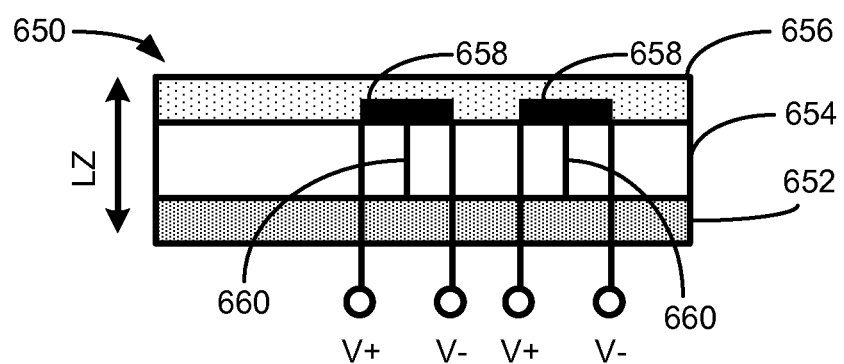
FIG. 17 illustrates a cross sectional view of the unit cell illustrated in FIG. 16.

By configuring the hybrid components 608 in various ways, such as those described herein, nearly any surface impedance for the metamaterial 600 can be achieved. FIGS. 16 and 17 illustrate an example of a unit cell 650 with a predetermined impedance, which unit cell 650 can be employed in the metamaterial 600 illustrated in FIG. 15. FIG. 16 illustrates a plan view of the unit cell 650, while FIG. 17 illustrates a cross sectional view of the unit cell 650. The unit cell 650 could be employed, for example, in an artificial magnetic conductor. The unit cell 650 can include a conductive substrate layer 652 and an artificial dielectric layer 654, with a relative dielectric constant, $\in_r$ of about 500. The artificial dielectric layer 654, could be implemented, for example as the artificial dielectric material 50 illustrated in FIG. 2 (including the unit cell 430 illustrated in FIG. 10), the dielectric material 150 illustrated in FIG. 4, etc. A planarizing layer 656 can be applied over the artificial dielectric layer 654. The planarizing layer 656 can be implemented, for example, as a fluorosilicone polymer. The unit cell 650 can have physical dimensions, $L_x$ (labeled in FIG. 16 as 'LX'), $L_y$ (labeled in FIG. 16 as 'LY') and $L_z$ (labeled in FIG. 17 as 'LZ'). Hybrid components 658 can be mounted on the artificial dielectric layer 654. Vias 660 can electrically couple the hybrid components mounted on the artificial dielectric layer 654 to the conductive substrate layer 652. In some examples, such as described herein, the hybrid components 658 can be configured to operate as inductors with a negative inductance, such as illustrated in FIG. 6. In such a situation, supply voltages, labeled in FIG. 17 as 'V+' and 'V−' can be applied to the hybrid components 658 to power, for example active components of the hybrid components 658 (e.g., an operational amplifier).

The unit cell 650 can be configured, for example, as two inductors (labeled in FIG. 16 as 'L') that are oriented perpendicularly relative to each other, as illustrated in FIG. 16. In one example, the inductors can provide an inductance of −9 nano-Henries (nH). The unit cell 650 can be electrically coupled to adjacent unit cells via terminals 662.

Figure 18:
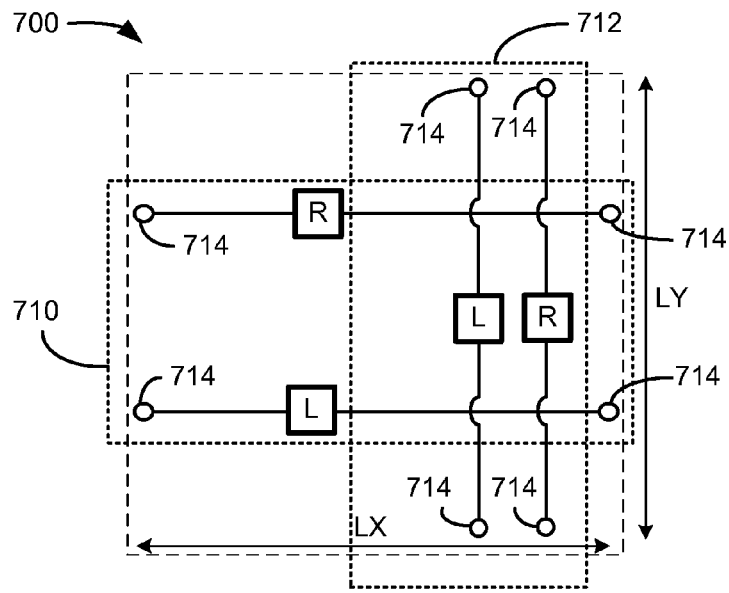
FIG. 18 illustrates a plan view of another example of a unit cell for a metamaterial.
Figure 19:
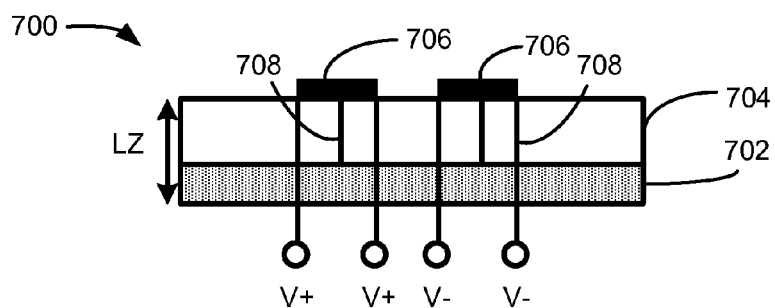
FIG. 19 illustrates a cross sectional view of the unit cell illustrated in FIG. 18.

Referring back to FIG. 15, by configuring the metamaterial 600 to implement the unit cell 650 illustrated in FIGS. 16 and 17, the metamaterial 600 can provide performance characteristics of both an artificial dielectric material and an artificial magnetic material. In such a situation, the metamaterial 600 could be implemented as an artificial magnetic conductor. In other examples, the metamaterial 600 could be configured as a surface wave absorber. FIGS. 18 and 19 illustrate an example of a unit cell 700 that could be implemented in a surface wave absorber.

FIG. 18 illustrates a plan view of the unit cell 700, while FIG. 19 illustrates a cross sectional view of the unit cell 700. The unit cell 700 can include a conductive substrate layer 702 and an artificial dielectric layer 704, with a relative dielectric constant, $\in_r$ of about 500. The artificial dielectric layer 704, could be implemented, for example as the artificial dielectric material 50 illustrated in FIG. 2 (including the unit cell 430 illustrated in FIG. 10), the dielectric material 150 illustrated in FIG. 4, etc. The unit cell 650 can have physical dimensions, $L_x$ (labeled in FIG. 18 as 'LX'), $L_y$ (labeled in FIG. 18 as 'LY') and $L_z$ (labeled in FIG. 19 as 'LZ'). Hybrid components 706 can be mounted on the artificial dielectric layer 704. Vias 708 can electrically couple the hybrid components 706 mounted to the artificial dielectric layer 704, to the conductive substrate layer 702. In some examples, such as described herein, some of the hybrid components 706 of the unit cell 700 can be configured to operate as inductors with a negative inductance, such as illustrated in FIG. 6. In such a situation, supply voltages, labeled and FIG. 19 as 'V+' and 'V−' can be applied to the hybrid components 706 to power, for example active components of the hybrid components 706 (e.g., an operational amplifier).

The unit cell 700 can be configured, for example, as a first set of a resistor and an inductor 710, labeled in FIG. 18 as 'R' and 'L' oriented parallel to each other. A second set of a resistor and an inductor 712 can also be oriented parallel to each other. Moreover, the first and second sets of resistors and inductors 710 and 712 can be electrically decoupled and oriented perpendicularly to each other, as illustrated in FIG. 18. In one example, the inductors can provide an inductance of −9 nH, and the resistors can be configured to provide a resistance of about 1000 Ohms. The unit cell 700 can be electrically coupled to adjacent unit cells via terminals 714.

Referring back to FIG. 15, by configuring the metamaterial 600 to implement the unit cell 650 illustrated in FIGS. 16 and 17 and/or the unit cell 700 illustrated in FIGS. 18 and 19, the metamaterial 600 can be configured to provide performance characteristics of both an artificial dielectric material and an artificial magnetic material, as noted herein. For instance, the metamaterial 600 can be configured to provide a broadband large surface impedance. Thus, as noted, the metamaterial 600 could be implemented as a surface wave absorber or an artificial magnetic conductor.

Figure 20:
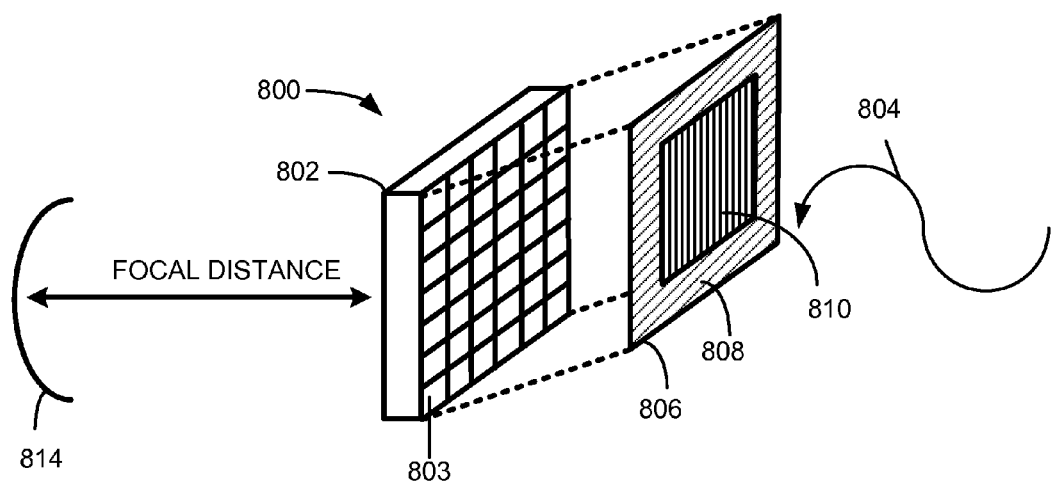
FIG. 20 illustrates an example of an anti-jamming system for a radar system that employs a metamaterial.

FIG. 20 illustrates an example of an anti-jam system 800 that can employ a metamaterial 802, such as the artificial dielectric material 50 illustrated in FIG. 2 with an array of unit cells 803, such as the unit cell 300 illustrated in FIG. 7, the unit cell 430 illustrated in FIG. 10 and/or the unit cells 450 illustrated in FIGS. 11 and 12. The anti-jam system 800 can be implemented in a radar system or a communication system and can be employed to filter out a jamming signal 804, which jamming signal 804 is provided to interfere with the radar system. In such an example, the metamaterial 802 can be coated with a tapered resistance film 806 that can include a low resistance region 808 around a periphery (e.g. about 5 Ohms per square unit area) of the metamaterial 802 and a high resistance region 610 (e.g., about 1000 Ohms per square unit area) that circumscribes a center of the metamaterial 802.

The refractive index of one or more unit cells 803 in the metamaterial 802 can be tuned (e.g., by a control signal, such as a control voltage) to operate as a converging lens. In other examples, fixed capacitors could be employed to operate as the converging lens. In either situation, the resultant converging lens operates as a spatial filter that can separate a jamming signal 804 from a desired signal that is transmitted to a detector array 814. Separation of the jamming signal 804 from the desired signal would allow a radar system coupled to the detector to operate properly in spite of reception of the jamming signal 804.

Figure 21:
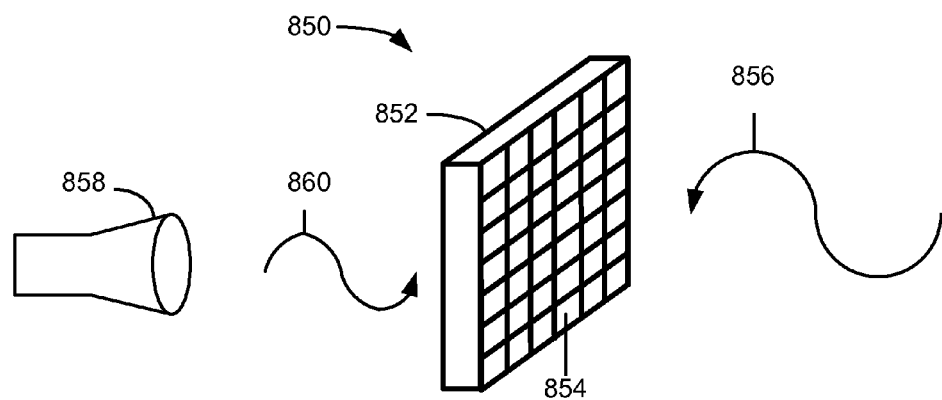
FIG. 21 illustrates an example of a phased array that employs a metamaterial.

FIG. 21 illustrates an example of a phased array 850 that can employ a metamaterial 852, such as the artificial dielectric material 50 illustrated in FIG. 2 with an array of unit cells 854, such as the unit cell 300 illustrated in FIG. 7, the unit cell 430 illustrated in FIG. 10 and/or the unit cells 450 illustrated in FIGS. 11 and 12. A phased array is a group of antennas in which the relative phases of the respective signals feeding the antennas are varied in such a way that an effective radiation pattern of the array is reinforced in a desired direction and suppressed in undesired directions. The phased array 850 can be configured to independently tune performance characteristics (e.g., gain and/or phase shifts) at the unit cells 854 (or certain groups of the unit cells 854, such as groups spanning about ½ of a wavelength of interest in each direction) of the metamaterial 852 for an incoming signal 856 thereby directing and reinforcing the incoming signal 856 passing through the metamaterial 852 toward a low gain antenna 858, such as a feed horn. In other examples, the same (or similar) metamaterial 852 can direct an out-going signal 860 into any of 2π steradians of solid angle.

Figure 22:
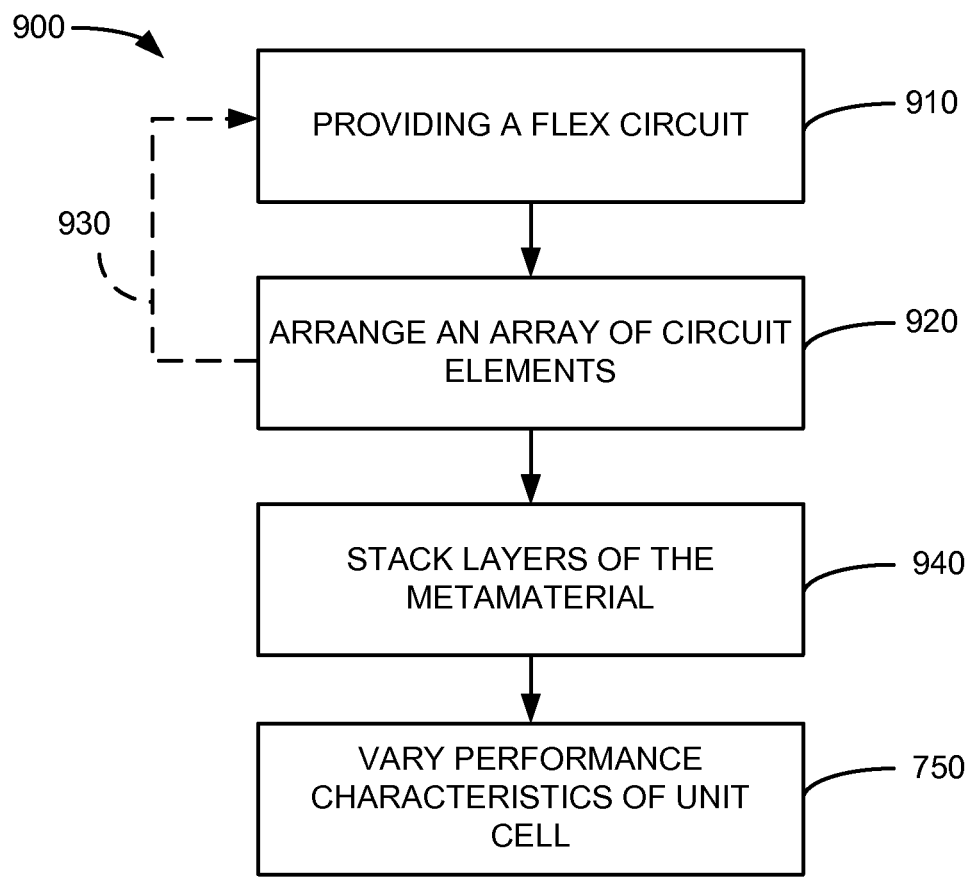
FIG. 22 illustrates an example of a flow chart of a method for fabricating a metamaterial.

In view of the foregoing structural and functional features described above, example methodologies will be better appreciated with reference to FIG. 22. While, for purposes of simplicity of explanation, the example methods of FIG. 22 are shown and described as executing serially, it is to be understood and appreciated that the present examples are not limited by the illustrated order, as some actions could in other examples occur in different orders and/or concurrently from that shown and described herein.

FIG. 22 illustrates an example of a flow chart for an example of a method 900 for fabricating a metamaterial (e.g., the metamaterial 2 illustrated in FIG. 1) that can be employed in an RF communications apparatus. The method 900 can be implemented, for example, via robotic circuit fabrication techniques. The metamaterial can be implemented, for example, as an artificial dielectric (e.g., the artificial dielectric 50 illustrated in FIG. 2) and/or as an artificial magnetic material (e.g., the artificial magnetic material 500 illustrated in FIG. 13), or a combination of both (e.g., the metamaterial 600 illustrated in FIG. 15). At 910, a flex circuit can be provided. At 920, an array of circuit elements can be arranged to electrically couple at least one hybrid component to a conductive trace in each element to provide at least one of a predetermined relative dielectric constant and a predetermined relative magnetic permeability for the metamaterial.

As noted by the arrow at 930, the actions at 910 and 920 can be repeated to form multiple layers for the metamaterial. In the present example, it will be presumed that two layers of the metamaterial are formed, namely first and second layers of metamaterial, but more or less layers of metamaterial could be formed in some examples. At 940, the first and second layers of the metamaterial are stacked to provide a unit cell that defines performance characteristics per unit volume of the metamaterial. The unit cell can be implemented to provide time invariant performance characteristics, for example by employing the unit cell 300 illustrated in FIG. 3. Additionally or alternatively, the unit cell can be implemented in a manner similar to the unit cell 450 illustrated in FIGS. 11 and 12, such that the performance characteristics of the unit cell vary as a function of an amplitude of a control signal, such as a control voltage. At 950, the performance characteristics of the unit cell are varied by changing the amplitude of the control signal.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A metamaterial for a radio frequency communications apparatus, the metamaterial comprising:
   a flex circuit; and
   an array of circuit elements mounted on the flex circuit, wherein each of the circuit elements comprises:
      a conductive trace; and
      at least one hybrid component electrically coupled to the conductive trace;
   wherein the metamaterial is configured as an artificial dielectric material, and the at least one hybrid component further comprises an impedance that varies as a function of an amplitude of a control signal to provide tunable properties of the metamaterial.

2. The metamaterial of claim 1, wherein the metamaterial is configured as an artificial dielectric material, and the at least one hybrid component further comprises an RLC parallel tank circuit.

3. The metamaterial of claim 2, wherein the at least one hybrid component comprises a plurality of capacitors.

4. The metamaterial of claim 2, wherein the metamaterial is configured to provide an index of refraction greater than 3.

5. The metamaterial of claim 1, wherein the metamaterial is configured as one of an artificial magnetic conductor and a surface wave absorber, and the at least one hybrid component provides a negative inductance.

6. The metamaterial of claim 1, wherein the metamaterial is configured as an artificial magnetic material, such that each of the circuit elements comprises a loop.

7. The metamaterial of claim 6, wherein each of the circuit elements comprises a pair of concentric loops.

8. An anti-jam system for a radar system that comprises the metamaterial of claim 1, wherein the metamaterial is configured as a lens having a positive relative dielectric constant to filter an incoming jamming signal provided toward the radar system.

9. The anti-jam system of claim 8, further comprising a resistive film disposed on the artificial dielectric material.

10. The anti-jam system of claim 9, wherein the resistive film comprises a high resistance region and a low resistance region.

11. A phased array comprising the metamaterial of claim 1, wherein the metamaterial comprises a plurality of unit cells that have independently controllable performance characteristics to direct an incoming electromagnetic wave toward an antenna, and/or direct an out-going electromagnetic wave in any of 2π steradians of solid angle.

12. A radio frequency communications apparatus including an artificial dielectric material, the artificial dielectric material comprising:
   a plurality of layers of flex circuit that are stacked relative to each other, wherein each layer of flex circuit of the plurality of layers of flex circuit includes an array of circuit elements mounted thereon, wherein each circuit element of the array of circuit elements comprises:
      conductive traces that are separated by a gap and extend linearly; and
      a hybrid component mounted in the gap to electrically couple the conductive traces;
   wherein the artificial dielectric material is configured to define a plurality of unit cells that define per unit volume performance characteristics of the artificial dielectric material.

13. The artificial dielectric material of claim 12, wherein each unit cell is configured to define an RLC parallel tank circuit for current conduction in three different orthogonal directions.

14. The artificial dielectric material of claim 12, wherein at least two of the layers of flex circuit of the plurality of layers of flex circuit are electrically coupled by a pogo pin.

15. The artificial dielectric of claim 12, wherein at least two of the layers of flex circuit of the plurality of layers of flex circuit are separated by a foam layer.

16. The artificial dielectric of claim 12, wherein at least two of the layers of flex circuit are electrically coupled by male and female surface mount connectors.

17. The artificial dielectric of claim 12, wherein the artificial dielectric provides a relative dielectric constant greater than 1000.

18. A method for fabricating a layer of metamaterial for a radio frequency communications apparatus, the method comprising:

providing a flex circuit;

arranging an array of circuit elements to electrically couple at least one hybrid component to a conductive trace in each circuit element to provide at least one of a predetermined relative dielectric constant and a predetermined relative magnetic permeability for the metamaterial.

19. The method of claim 18, wherein the layer of metamaterial is a first layer of metamaterial, the method further comprising:

repeating the method of claim 18 to form a second layer of metamaterial;

stacking the first and second layers of metamaterial to provide a unit cell that defines performance characteristics per unit volume of the metamaterial.

20. The method of claim 19, further comprising varying the performance characteristics of the unit cell by changing an amplitude of a control signal.

* * * * *